No. 661,152. Patented Nov. 6, 1900.
W. J. McCAUSLAND.
MACHINE FOR MAKING COP TUBES.
(Application filed June 23, 1900.)
(No Model.) 2 Sheets—Sheet 1.
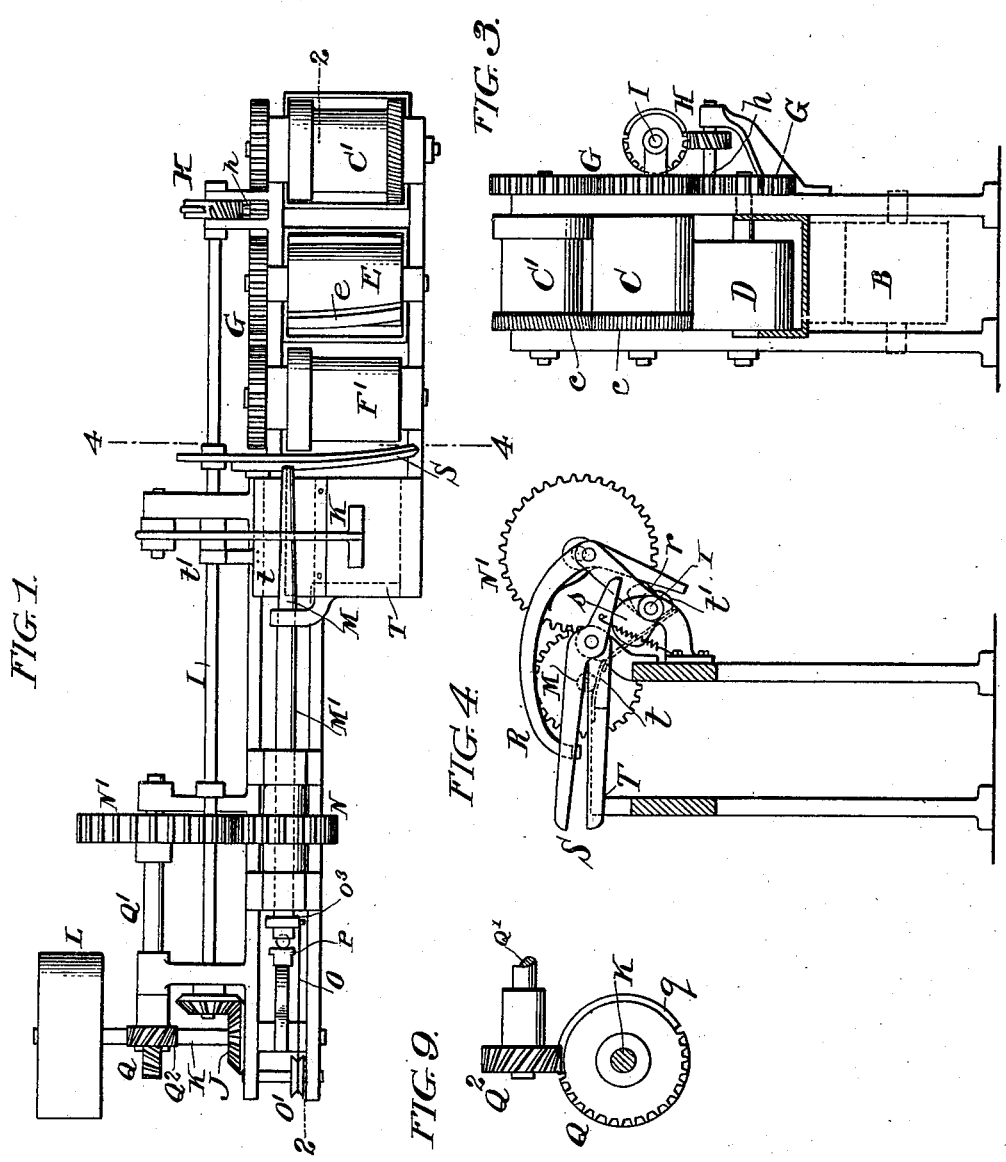
WITNESSES.
INVENTOR.
Wm. J. McCausland No. 661,152. Patented Nov. 6, 1900.
W. J. McCAUSLAND.
MACHINE FOR MAKING COP TUBES.
(Application filed June 23, 1900.)
(No Model.) 2 Sheets—Sheet 2.
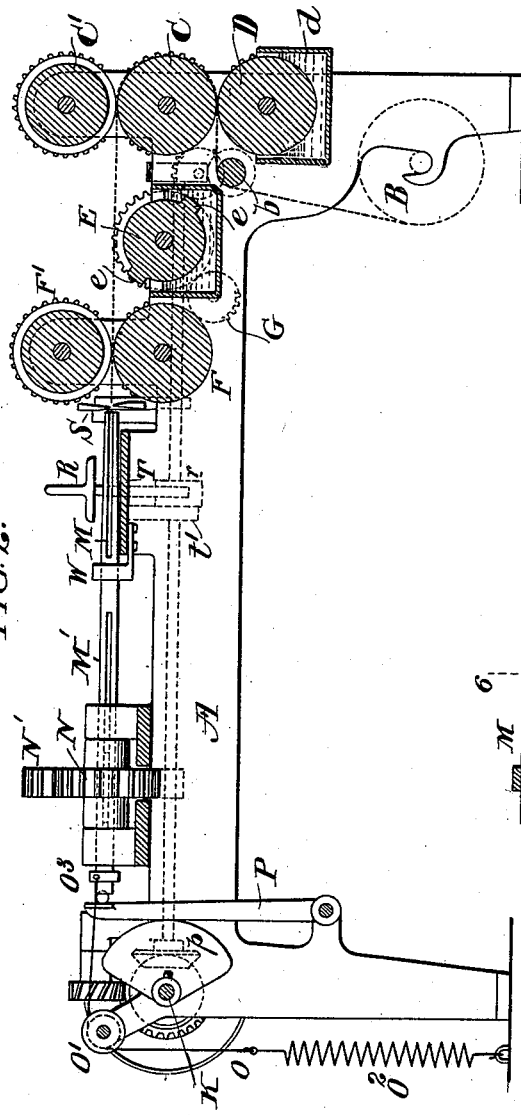
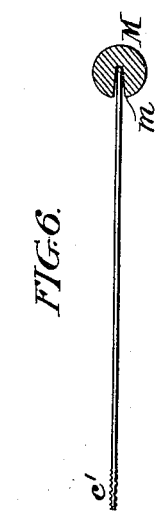
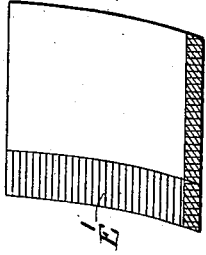
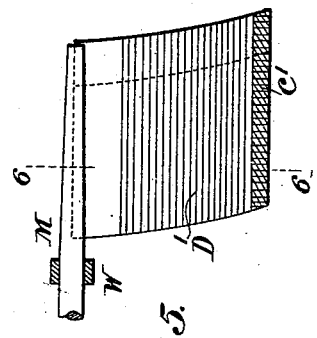
WITNESSES.
INVENTOR.
Wm. J. McCausland
By his atty

UNITED STATES PATENT OFFICE.

WILLIAM J. McCAUSLAND, OF CAMDEN, NEW JERSEY.

MACHINE FOR MAKING COP-TUBES.

SPECIFICATION forming part of Letters Patent No. 661,152, dated November 6, 1900.

Application filed June 23, 1900. Serial No. 21,260. (No model.)

*To all whom it may concern:*

Be it known that I, WILLIAM J. MCCAUSLAND, of Camden, county of Camden, and State of New Jersey, have invented an Improvement in Machines for Making Cop-Tubes, of which the following is a specification.

My invention has reference to machines for making cop-tubes; and it consists of certain improvements, which are fully set forth in the following specification and shown in the accompanying drawings, which form a part thereof.

The object of my invention is to provide a suitable construction of machine which shall automatically and rapidly produce perfect cop-tubes having special construction, more particularly set out in another pending application of mine bearing even date with this.

Generally speaking, the cop-tube for which my present machine is adapted is formed by winding a specially-shaped piece of paper upon a tapering mandrel, the said paper being cut from a continuous paper-roll after paste or glue has been applied to the surfaces thereof in a predetermined manner, the object being to secure a cop-tube having a pliable body and a more or less hardened upper and smaller end which shall resist to a greater extent than usual the tendency to break down or become injured under pressure.

In carrying out my invention I provide means for intermittently feeding a strip of paper by suitable rolls and apply upon the opposite faces thereof paste or glue in such a manner that the paste on one side will secure the coils of the finished tube together in the body portion and the glue on the other side will act to strengthen the small end of the tube so formed. The paper strip so prepared with glue and paste is fed into a tapered mandrel and at the same time cut off in given lengths by a suitable shears or cutter. The mandrel is then rotated to coil up the small specially-formed sheet thus prepared, and after it has been completely coiled the mandrel is withdrawn through a stripper and the tube dislodged and allowed to fall into the receiving-receptacle. If preferred, the tube may be formed of sized or calendered paper to impart additional strength to the body of the tube, and when such material is employed I prefer to abrade or mechanically soften the edge of the paper in passing through the feeding-rollers, so that said edge which comes upon the outer surface of the tube shall positively adhere to the body of the tube and avoid the possibility of its uncoiling.

My improvements will be better understood by reference to the drawings, in which—

Figure 1 is a plan view of my improved machine for making cop-tubes with the paper removed. Fig. 2 is a longitudinal sectional elevation of same on line 2 2 of Fig. 1 and showing the paper in position. Fig. 3 is an end elevation of same. Fig. 4 is a cross-section of same on line 4 4 of Fig. 1. Fig. 5 is a plan view showing the mandrel and paper sheet ready to be coiled. Fig. 6 is a cross-section of same on line 6 6. Fig. 7 is an inverted plan view of the paper sheet shown in Fig. 5. Fig. 8 is a perspective view of the finished cop-tube, and Fig. 9 is an elevation of the intermittently-acting spiral gears.

A is the main frame of the machine, and C C' and F F' are two pairs of feeding-rolls, between which the paper web passes. The roll of paper B is hung in the lower part of the machine and the end thereof is passed up over a guide-roll $b$, thence between feed-roller C and pasting-roll D, which runs in a vat $d$. The paper after being thus pasted passes around the roller C and between it and the feed-roll C'. The roller C' is recessed in its surface, so as not to squeeze out the paste. The upper surface of the web of paper is thus pasted for the greater part of its width, as indicated at D' in Fig. 5. The width of the layer of paste corresponds to the length of the pasting-roller D. As the web of paper passes from the rollers C C' to feed F F' a pasting-roller E, having curved paste-applying surfaces $e$, applies paste or glue to the under surface of the web at given distances in its length. These correspond to the glued parts E'. (Shown in Fig. 7 and indicated in dotted lines shown in Fig. 5.) The web thus pasted is fed over a table T and is cut off on a curved line, as indicated in Fig. 5, by the curved shears S. In this manner the sheets to be coiled into the cop-tube are formed with parallel straight edges in one direction and parallel curved edges in the other direction. One of the straight edges of the paper sheet—namely, that edge adjacent to the unpasted portion of the upper surface—is received in a groove $m$ of the mandrel, which is made tapering, as shown in Fig. 5. At the time that the paper strip is cut off to subdivide it into sheets the said sheet is held in position by a clamp R, which temporarily holds the sheet on the table. The mandrel then begins to rotate, and the pressure of the clamp R is removed, permitting the sheet to be coiled upon itself about the mandrel until it assumes the construction shown in Fig. 8. A spring-plate $t$ presses the paper against the mandrel as it rotates and is moved away from the mandrel by a cam $t'$ when it is discharging the tube.

The mandrel M is formed on the end of a reciprocating and rotating shaft M', which is rotated by a pinion N, concentric with it, said pinion being driven by a spur-gear N' on a rotating shaft Q'. The shaft Q' is intermittently rotated by means of spiral gears, one of said gears, $Q^2$, being upon the shaft Q' and the other, Q, upon the power-shaft K, which is driven by suitable belt-pulleys L. Gear Q is of twice the diameter of gear $Q^2$ and has one half of its circumference provided with teeth and the other half with a longitudinal rib $g$, which locks the gear $Q^2$ in a stationary position, so that the mandrel is caused to rotate intermittently, being held stationary for about the same period that it is rotated. When stationary, the mandrel is reciprocated to dislodge the cop-tube. The mandrel-shaft M' is drawn back or in one direction by means of a band O, connected to a collar $O^3$ on its end, guided over a guide-roller O', and having its other end connected to a spring $O^2$. The mandrel-shaft is moved in the opposite direction or into position for coiling by means of a pivoted arm P, acting upon the end of the mandrel-shaft or a ball-bearing therein and moved under the action of a cam $p$ on the power-shaft K. In this manner the mandrel is alternately rotated and reciprocated. When the mandrel is withdrawn by the action of the spring after the tube has been coiled upon it, it passes through the stripper W, which strips off the finished tube and permits it to fall down into a suitable receptacle.

All of the rollers C, C', F, F', E, and D are geared together by a suitable train of gears G, so that they all run at the same surface speeds. Power is supplied to this train of gears by means of a pinion $h$, driven by means of spiral gears H, similar to the gears Q $Q^2$, one of said gears being rigid with the pinion $h$ and the other being secured to a shaft I, extending the length of the machine and receiving power from the shaft K through bevel-gears J. The pinion $h$ is preferably geared with the spur-wheel on the pasting-roll D; but this is not essential, as it may mesh with any of the gears of the train, provided the right direction of rotation is secured. By this means the train of gears G and the feeding-rolls and pasting-rolls are moved intermittently, and vice versa, with the rotations of the mandrel.

The shaft I is provided with a cam $s$ for operating the shears S and a cam $r$ for operating the clamp R, as indicated at Fig. 4. It also has the cam $t'$ for operating the spring-plate $t$, before referred to. The proportions and constructions of the various gears are such that the feeding action on the paper strip shall insure the requisite length of paper being fed over the table T sufficient to form the length of the tube, and this extent of paper must be fed between each series of revolutions of the mandrel or while the mandrel is making its reciprocations, so that upon the mandrel taking its position indicated in Fig. 1 it will have received the edge of a fresh sheet and be ready to wind it into a tube.

Where the paper is sized and calendered it is important to abrade or soften the edge thereof farthest from the mandrel, and this is accomplished by providing the rollers C C' with milled surfaces $c$ adjacent to one end, one of said milled surfaces operating on the upper part of the sheet and the other upon the lower part. It is also preferable that the milled edges shall be differently formed, so as to break down the texture of the paper adjacent to this edge, whereby it will more readily retain its position after being pasted down. It is evident, however, that while it is convenient to provide these milled surfaces on the rollers C C' they may be formed on any other roller or rollers, and, if desired, one of them alone may be used.

While I prefer the general construction herein set out as being excellently adapted for the purposes of my invention, I do not limit myself to the minor details, as they may be modified in various ways without departing from the spirit of the invention.

Having now described my invention, what I claim as new, and desire to secure by Letters Patent, is—

1. In a machine for making paper tubes, the combination of rollers for feeding a web of paper, means for intermittently rotating said rollers, a pasting device for applying paste longitudinally upon one side except a narrow strip near one edge, a cutter to sever the web at stated intervals transversely on curved lines, a coiling-mandrel for receiving the unpasted edge of the web for a distance corresponding to the length of the subdivisions, means for intermittently rotating the mandrel to coil the sheet, and connecting means for controlling the means for rotating the mandrel and feed-rollers whereby they operate alternately.

2. In a machine for making paper tubes, the combination of rollers for feeding a web of paper, means for intermittently rotating said rollers, a pasting device for applying paste longitudinally upon one side except a narrow strip near one edge, additional devices for applying an adhesive substance to the opposite side of the web transversely to its length at uniform intervals, a cutter to sever the web at stated intervals transversely on curved lines, a coiling-mandrel for receiving the unpasted edge of the web for a distance corresponding to the length of the subdivisions, means for intermittently rotating the mandrel to coil the sheet, and connecting means for controlling the means for rotating the mandrel and feed-rollers whereby they operate alternately.

3. In a machine for making paper tubes, the combination of rollers for feeding a web of paper, means for intermittently rotating said rollers, a pasting device for applying paste longitudinally upon one side except a narrow strip near one edge, additional devices for applying an adhesive substance to the opposite side of the web transversely to its length at uniform intervals and on curved lines terminating with the line of transverse severance, a cutter to sever the web at stated intervals transversely on curved lines, a coiling-mandrel for receiving the unpasted edge of the web for a distance corresponding to the length of the subdivisions, means for intermittently rotating the mandrel to coil the sheet, and connecting means for controlling the means for rotating the mandrel and feed-rollers whereby they operate alternately.

4. In a machine for making paper tubes, the combination of rollers for feeding a web of paper, means for intermittently rotating said rollers, a pasting device for applying paste longitudinally upon one side except a narrow strip near one edge, means for abrading or mechanically softening the pasted edge of the web opposite to the unpasted edge whereby it will more readily adhere in the coiling operation, a cutter to sever the web at stated intervals transversely on curved lines, a coiling-mandrel for receiving the unpasted edge of the web for a distance corresponding to the length of the subdivisions, means for intermittently rotating the mandrel to coil the sheet, and connecting means for controlling the means for rotating the mandrel and feed-rollers whereby they operate alternately.

5. In a machine for making paper tubes, the combination of rollers for feeding a web of paper, means for intermittently rotating said rollers, a pasting device for applying paste longitudinally upon one side except a narrow strip near one edge, a cutter to sever the web at stated intervals transversely on curved lines, a coiling-mandrel for receiving the unpasted edge of the web for a distance corresponding to the length of the subdivisions, means for intermittently rotating the mandrel to coil the sheet, connecting means for controlling the means for rotating the mandrel and feed-rollers whereby they operate alternately, means for reciprocating the mandrel longitudinally when not rotating, and a stationary stripper to strip the tube from the mandrel during the reciprocation.

6. In a machine for making paper tubes, the combination of rollers for feeding a web of paper, means for intermittently rotating said rollers, a pasting device for applying paste longitudinally upon one side except a narrow strip near one edge, means for abrading or mechanically softening the pasted edge of the web opposite to the unpasted edge whereby it will more readily adhere in the coiling operation, additional devices for applying an adhesive substance to the opposite side of the web transversely to its length at uniform intervals, a cutter to sever the web at stated intervals transversely on curved lines, a coiling-mandrel for receiving the unpasted edge of the web for a distance corresponding to the length of the subdivisions, means for intermittently rotating the mandrel to coil the sheet, connecting means for controlling the means for rotating the mandrel and feed-rollers whereby they operate alternately, means for reciprocating the mandrel longitudinally when not rotating, and a stripper to strip the tube from the mandrel during the reciprocation.

7. In a machine for making tubes of paper, the combination of means for intermittently feeding a web of paper, means for applying paste to the surface of said web, means for abrading or mechanically softening the edge of the web which is to be pasted, a cutter for cutting the pasted web into sheets of given lengths, and an intermittently-rotating mandrel for coiling the paper sheets.

8. In a machine for making tubes of paper, the combination of means for intermittently feeding a web of paper, means for applying paste to the surface of said web, means for abrading or mechanically softening the edge of the web which is to be pasted, a cutter for cutting the pasted web into sheets of given lengths, an intermittently-rotating mandrel for coiling the paper sheets, and a spring-plate for pressing the pasted sheet against the mandrel during the coiling operation.

9. In a machine for making tubes of paper, the combination of means for intermittently feeding a web of paper, means for applying paste to the surface of said web, means for abrading or mechanically softening the edge of the web which is to be pasted, a cutter for cutting the pasted web into sheets of given lengths on curved lines, an intermittently-rotating mandrel for coiling the paper sheets, and an intermittently-operated finger or clamp to hold the severed sheet for a short period of time until the mandrel begins to rotate.

10. In a machine for making tubes of paper, the combination of means for intermittently feeding a web of paper, means for applying paste longitudinally to one of the surfaces of said web, means for applying an adhesive substance to the opposite surface on transverse lines at intervals apart, means for abrading or mechanically softening the edge of the web which is to be pasted, a cutter for cutting the pasted web into sheets of given lengths, and an intermittently-rotating mandrel for coiling the paper sheets.

11. In a machine for making paper tubes, the combination of means for feeding a web of paper intermittently, means for applying paste to one surface throughout its length, means for applying an adhesive substance to the other face on transverse lines at intervals apart, means to subdivide the web into sheets at each of the transverse lines of adhesive substance, and a coiling-mandrel for coiling the pasted sheets.

In testimony of which invention I have hereunto set my hand.

WM. J. McCAUSLAND.

Witnesses:
R. M. HUNTER,
J. W. KENWORTHY.